US009501696B1

(12) United States Patent
Cabán et al.

(10) Patent No.: US 9,501,696 B1
(45) Date of Patent: Nov. 22, 2016

(54) SYSTEM AND METHOD FOR METADATA EXTRACTION, MAPPING AND EXECUTION

(71) Applicants: William Cabán, Caguas, PR (US); Roberto Rosario, San Juan, PR (US)

(72) Inventors: William Cabán, Caguas, PR (US); Roberto Rosario, San Juan, PR (US)

(*) Notice: Subject to any disclaimer, the term of this patent is extended or adjusted under 35 U.S.C. 154(b) by 0 days.

(21) Appl. No.: 15/019,164

(22) Filed: Feb. 9, 2016

(51) Int. Cl.
*G06K 9/34* (2006.01)
*G06K 9/00* (2006.01)
*G06F 17/30* (2006.01)

(52) U.S. Cl.
CPC ....... *G06K 9/00463* (2013.01); *G06F 17/3028* (2013.01); *G06F 17/30247* (2013.01); *G06K 9/00449* (2013.01); *G06K 9/344* (2013.01); *G06K 2209/27* (2013.01)

(58) Field of Classification Search
CPC ............... G06T 7/0081; G06T 2207/20144; G06T 7/0083; G06T 2207/10016; G06K 9/38; G06K 9/00442; G06K 9/2054; G06K 2009/3225; G03B 15/02; G03B 15/05; G03B 15/06; G03B 15/03; F21W 2131/406
See application file for complete search history.

(56) References Cited

U.S. PATENT DOCUMENTS

| | | | |
|---|---|---|---|
| 4,206,442 A | 6/1980 | Hoshino | |
| 4,403,340 A | 9/1983 | Kumpf | |
| 5,119,441 A | 6/1992 | Lin | |
| 6,044,375 A | 3/2000 | Greig | |
| 6,796,433 B2 | 9/2004 | Daniels, Jr. | |
| 7,475,335 B2 | 1/2009 | Krishna | |
| 7,689,613 B2 | 3/2010 | Candelore | |
| 7,711,729 B2 | 5/2010 | Zhao | |
| 8,320,674 B2 | 11/2012 | Guillou | |
| 8,452,132 B2 | 5/2013 | Isaev | |
| 8,675,012 B2 | 3/2014 | Ratnakar | |
| 8,693,790 B2 | 4/2014 | Jiang | |
| 8,792,715 B2 | 7/2014 | Brito | |
| 8,949,110 B2 | 2/2015 | McCombs | |
| 8,995,774 B1 | 3/2015 | van Deventer | |
| 2007/0041642 A1 | 2/2007 | Romanoff | |
| 2008/0162603 A1 | 7/2008 | Datar | |
| 2009/0024637 A1 | 1/2009 | Krishna | |
| 2010/0245938 A1 | 9/2010 | Coley | |

(Continued)

*Primary Examiner* — Duy M Dang
(74) *Attorney, Agent, or Firm* — Eugenio J. Torres-Oyola; Jose A. Medina-Cruz; Ferraiuoli LLC (57) ABSTRACT

The present disclosure provides a system and method for mapping zone-based metadata into one or more referenceable objects. The system and method extracts and/or generates metadata from a document according to custom zones defined in a document type. Each custom zone is associated to actions such as generating events, invoking triggers and/or invoking callback methods. One or more of these actions may be triggered when pre-processing or post-processing a document. According to an inventive concept of the present application, when a document is stored in a data storage and placed in a process queue to be processed by a suitable processing plugin according to the custom zones defined in the document. For instance, an image file comprising textual custom zones may be processed by an OCR plugin which extracts text metadata from the document. Other processing plugins include plugins to extract metadata from proprietary document formats such as CAD, PPTX, PDF, PSD, or others. Plugins are also available for generation of metadata by interpreting an image (i.e. detection or identification of objects and/or scenery in an image) through artificial intelligence and computer vision means. The process queue can be used for scalability of the quantity of actions to process.

19 Claims, 6 Drawing Sheets

(56) References Cited

U.S. PATENT DOCUMENTS

2011/0255113 A1   10/2011   Wei
2013/0294694 A1   11/2013   Wilson
2014/0212040 A1    7/2014   Burtoft

100

102

Company Inc

106

Bill to:
Acme Group LLC
Somewhere Else St.
Central Store, ZZ 7654321

Ship to:
Acme Inc
Somewhere St.
Dreamland, AA 1234567

112

104

Order No. 201508012

Delivery No. 201508012/R38

| Item No. | Description | Order Qty | Deliver Qty |
|---|---|---|---|
| FCY-ITEM1 | Fancy Item 1 | 30 | 28 |
| FCY-ITEM2 | Fancy Item 2 | 10 | 10 |
| FCY-ITEM3 | Fancy Item 3 | 5 | 5 |
| FCY-ITEM4 | Fancy Item 4 | 15 | 15 |
| FCY-ITEM5 | Fancy Item 5 | 400 | 250 |
| FCY-ITEM6 | Fancy Item 6 | 75 | 75 |
| FCY-ITEM7 | Fancy Item 7 | 20 | 20 |
| FCY-ITEM8 | Fancy Item 8 | 30 | 10 |

108

110

Received by: ___________

Page 1 of 5

Date: ___________

SYSTEM AND METHOD FOR METADATA EXTRACTION, MAPPING AND EXECUTION

BACKGROUND

Systems and methods for metadata extraction, generation, mapping and execution have been described in the computer arts with varying degrees of success.

For instance, U.S. Patent Publication US 2013/0294694 (Zhang) teaches a method for zone-based metadata extraction that allows users to select zones in a text document in order to extract metadata using optical character recognition (OCR) on said zones and to store the metadata in a database.

U.S Patent Publication US2008/0162603 (Garg) teaches a method whereby an image document is turned into a text document. According to Garg, the user creates a template specifying the portions of an image document to be OCR'd. The system then receives a document, extracts textual metadata from said document and stores said metadata on a storage.

Similarly, U.S. Pat. No. 8,693,790 (Jiang) teaches a form template definition method. The form template definition method comprises a cell extraction step of analyzing an image thereby extracting one or more cells from the image. The method further includes a cell classification step of classifying the extracted cells and a cell attribute definition step of defining attributes of the extracted cells class by class. The inventive step behind Jiang is related to automatically copying the common attributes of a first cell to other cells.

However, none of the references provide an architecture to perform pre-processing or post-processing of a given document in order to perform actions based on a document type. The present disclosure overcomes the limitations found in the relevant art.

BRIEF SUMMARY

The present disclosure provides a system and method for mapping zone-based metadata into one or more reference-able objects. The system and method extracts and/or generates metadata from a document according to custom zones defined in a document type. Each custom zone is associated to actions such as generating events, invoking triggers and/or invoking callback methods. One or more of these actions may be triggered when pre-processing or post-processing a document.

The document can be input to the system through an Application Program Interface (API), a web interface accessible through an Internet browser, an e-mail protocol, a local or remote storage, or other file transfer protocols such as FTP, SCP, or SSH. The document format may be an image file such as a scanned file, a flattened image or any document format such as word processor files, CAD files, proprietary image files and the like.

According to an inventive concept of the present application, a document is stored in a data storage and placed in a process queue to be processed by a suitable processing plugin according to the custom zones defined in the document. For instance, an image file comprising textual custom zones may be processed by an OCR plugin which extracts text metadata from the document. Other processing plugins include plugins to extract metadata from proprietary document formats such as CAD, PPTX, PDF, PSD, or others. Plugins are also available for generation of metadata by interpreting an image (i.e. detection or identification of objects and/or scenery in an image) through artificial intelligence and computer vision means. The process queue can be used for scalability of the quantity of actions to process.

The data storage of the document types, documents or metadata may be of any suitable type such as object storage, file share storage, block storage, a path to a local folder, a database, raw disk access, magnetic media or in-memory storage.

DETAILED DESCRIPTION

Figure 1:
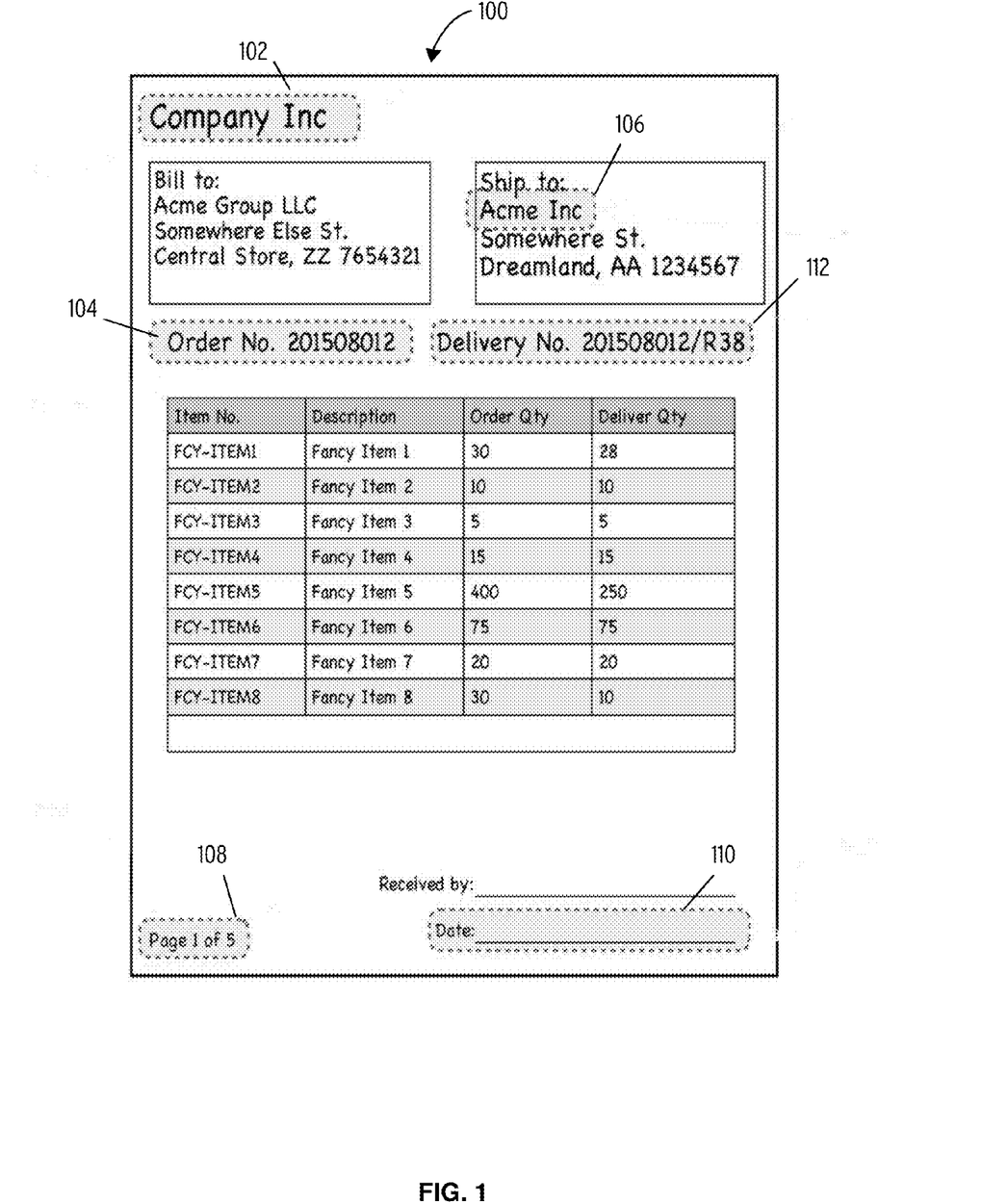
FIG. 1 illustrates a document and its corresponding document type.

FIG. 1 shows an exemplary document 100 with one or more zones comprising company name 102, order number 104, recipient 106, page number 108, date 110, delivery number 112 associated to a document type. The document type may also have a default zone corresponding to the totality of the document 100. In one embodiment, each page in its entirety is considered the default zone. The user can define new zones and associate them to a reference-able object. For instance, the user may map company name 102 to a reference-able object named Company_Name. Likewise, order number 104 may be mapped to reference-able object Order_Num, and so on. These zone definitions are associated to the document type "Invoices Template A." When an OCR first plugin service processes document 100, it stores the extracted or generated data in an object associated to an order document type.

Referring to FIG. 1, the OCR first plugin service processes document 100 and extracts company name 102, order number 104, recipient 106, page number 108, date 110, and delivery number 112. Multi-page documents may be detected, for example, by identifying the page number 108. When a multi-page document type is encountered, the system may store each page of the multi-page document separately to be processed by independent OCR first plugin services. The data from each independent OCR first plugin service may be stored on a single object which may trigger only when the totality of the multi-page document is received.

Figure 2:
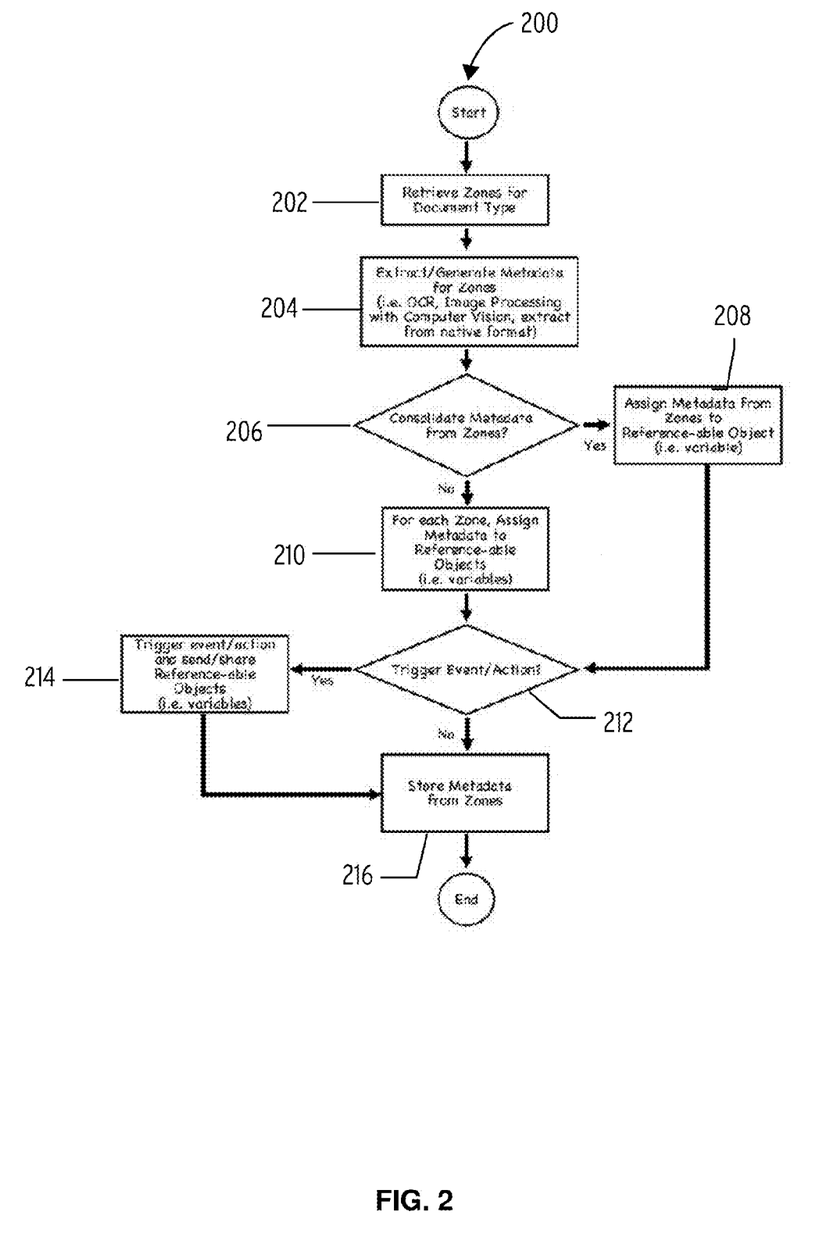
FIG. 2 illustrates the steps to extract or generate metadata elements from a document.

According to an embodiment shown in FIG. 2, in step 200, the system retrieves metadata from zones associated to a document type. In step 204, the system extracts or generates metadata for each zone in the document type. In step 206, the system verifies if the object requires metadata from each zone to be consolidated. In step 208, if metadata consolidation is required, the system instantiates a single object and assigns metadata to it. In step 210, if metadata consolidation is not required, the system instantiates one reference-able object per non-consolidated zones.

In step 212 and step 214, if the object requires triggering an event or an action, the system performs the required events or actions occasionally sending the object or sharing the object by, for example, storing the object in a shared storage. In step 216, after the triggers are processed, the extracted or generated metadata is stored or replicated to the data storage.

As shown in FIG. 2, the service retrieves zones for the document type and registers the document in a queue for processing. The appropriate plugins are notified of the existence of a document to extract or generate additional metadata from the document type zones, store the metadata in a persistent or ephemeral storage, and associate the metadata to the original document. The metadata can be stored in one or more formats. Metadata can be used for dynamic indexing of the original document or to invoke actions.

Once the metadata is extracted, generated or both for a particular zone, the service can be configured to group metadata from multiple zones into a single reference-able object or each zone can be mapped to a unique reference-able object. After the definition of the reference-able object the metadata and object can be stored for future reference or an event or action can be triggered.

Examples of an action or events include invoking another script or program, interact with an API or programmable interface, and other similar actions.

The metadata generation method includes processing and interpreting the contents of said document based on the document type. Advanced techniques, like computer vision and artificial intelligence, are used to analyze documents like images, diagrams, illustrations, photos, etc., and identify objects and scenery in the document. This identified information is included as part of the metadata associated to the original document.

Some proprietary formats like CAD, PST and others, can be interpreted by specialized plugins to detect internal labels, descriptions, annotations and other, which then can be set as part of the metadata associated to the original document.

Figure 3:
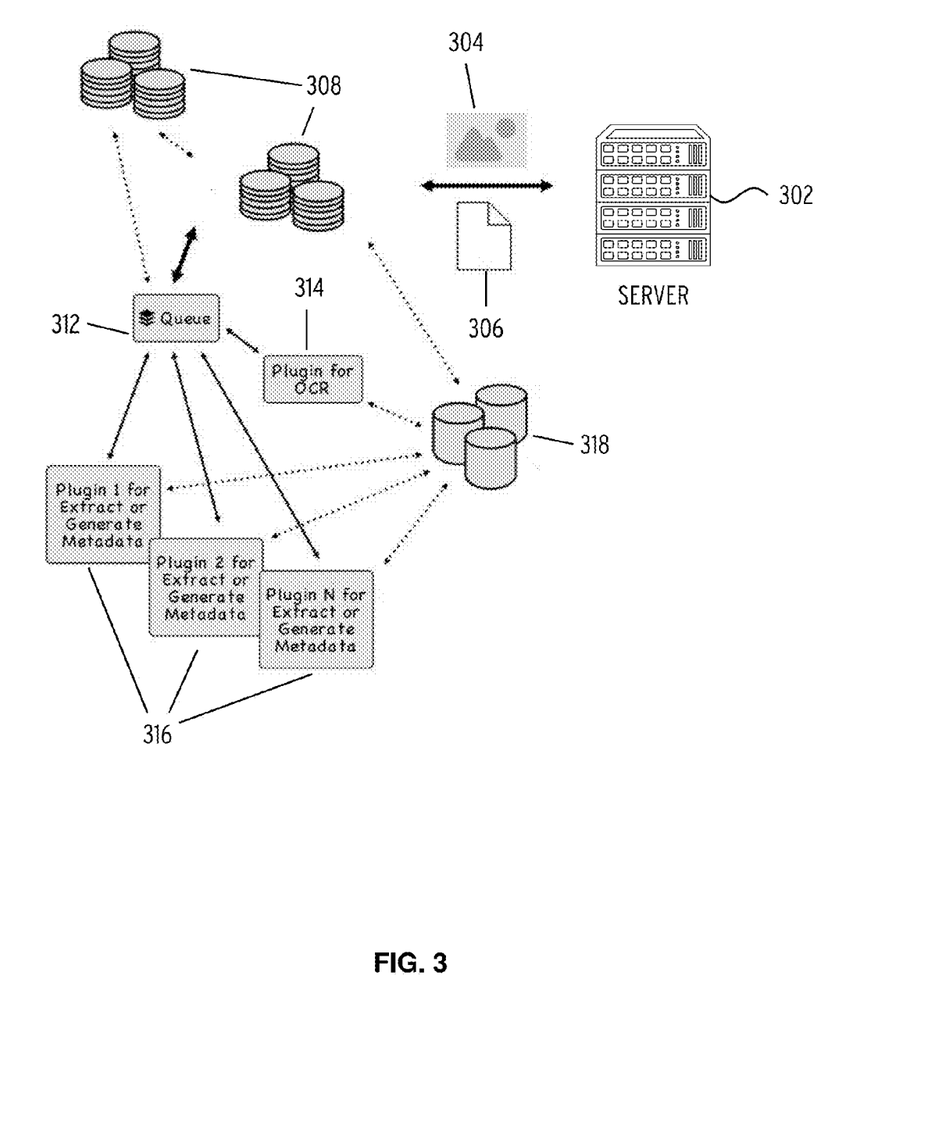
FIG. 3 illustrates an exemplary cloud system to perform the zone-based metadata extraction method.

As shown in FIG. 3, a document is a digital object to be processed by the services. When a new document is uploaded to the system by server 302, the service receives the digital object and initial metadata and stores it on object and metadata storage 308 which may comprise a persistent storage or ephemeral storage. For scalability and concurrent notification of multiple processes or micro services, a queue 312 can be used to register plugin notification through the channels relevant to their process or micro service. The queue 312 retrieves the zones of the corresponding document type and notifies other processes or micro services about the existence of the new document. These processes or micro services can be referred as plugins. An example of a plugin is OCR first plugin service 314 which affords optical character recognition (OCR) processing of a zone.

According to one embodiment, the system receives image 304 or file 306 (such as document 100) from server 302 and stores it in an object and metadata storage 308. If the plurality of zones in the image 304 or file 306 is associated to textual characters, the queue 312 notifies the OCR first plugin service 314 which processes each zone to extract the corresponding textual metadata elements. The OCR first plugin service 314 then assigns the textual metadata element to one or more objects associated to the document type which is stored in the metadata storage 318.

Other plugin services 316 may include capabilities for computer vision, artificial intelligence, and other technologies. If the plurality of zones are associated to one or more triggers, the system executes those triggers appropriately. Metadata storage 318 may replicate some or all of its data to object and metadata storage 308.

Advantageously, to upload a document to the service the server 302 can interact directly with APIs, Web Interface or many others. Capabilities to express the initial metadata of the document varies accordingly.

A preferred embodiment includes an API (i.e. RESTful Interface) to upload documents into the service. Interaction using the native API provides the ability to encode metadata as JSON, XML or other HTTP compliant data encoding mechanisms. When using the API, one or more documents may be uploaded at the same time.

The service supports various techniques to upload document over email. The user can configure a mailbox (IMAP, POP, etc) for the service to download email with attachments. The service can also be configured to enable direct reception of email using protocols like SMTP, ActiveSync, etc. By default, the attachments are processed as new documents. The user can opt to have a mailbox per document type or a single mailbox for multiple document types and include a special attachment to provide metadata and document type information to the service about the attachments. (i.e. Use a "metadata.yaml" file to encode metadata and document type classification of the other attachments in the email). The email itself can be map to a document type for email archiving or audit trails.

A filesystem folder or directory, local or remote (i.e. NFS, CIFS, etc.) can be used to upload documents to the service. Subfolders can be map to document types and special files (i.e. "metadata.yaml") can be used to map metadata to the documents in the folder. File sync and share services like Dropbox, Google Drive, iCloud Drive, etc, can be used as sources of document to the service. Techniques similar to the Folder can be used to upload and assign metadata to documents. Further, transfer protocols (i.e. FTP, SCP, SSH, etc) can be configured as targets to upload data using techniques similar to the Folders.

Other sources for documents may be used. For instance, multi-functional machines can be configured to send documents over email, folder, FTP servers or other supported source types, to upload documents to the service. Traditional scanners can be used to capture images or PDF of the documents and then use any of the supported source types to upload the documents to the service. Cameras can use to capture images and upload these as documents using any of the supported source types. Finally, protocols like WebDav, S3, Swift, RADOS and others are example of protocols which could be part of document source types maintaining the same capabilities.

In some embodiments, a computing system may include a first processor; a second processor; an object and metadata storage; a metadata storage; and/or a first memory storing instructions that, when executed by the first processor, configure the system store a document type, including a group of zones, in the object and metadata storage and assigning one or more triggers to one or more zones in the group of zones. The system is further configured to receive a document associated with the document type, storing the document in a queue service. The system then notifies a first plugin service associated to the one or more zones in the group of zones (such as OCR first plugin service 314).

The embodiment further includes a second memory storing instructions that, when executed by the second processor, configure the system to: extract, by the first plugin service, a metadata element associated to the one or more zones in the group of zones. The extracted (or generated) metadata element is assigned to one or more objects associated to the document type and these objects are stored in the metadata storage. Finally, the system invokes the one or more triggers assigned to the one or more zones in the group of zones.

In some embodiments, such a computing system may further include a third processor; wherein the first memory storing instructions further configures the first processor to notify a second plugin service associated to the one or more zones in the group of zones (such as any of the plugin services 316); and a third memory storing instructions that, when executed by the third processor, configure the system to extract, by the second plugin service, a metadata element associated to the one or more zones in the group of zones. The extracted (or generated) metadata element is assigned to one or more objects associated to the document type and these objects are stored in the metadata storage. Finally, the system invokes the one or more triggers assigned to the one or more zones in the group of zones.

Figure 4:
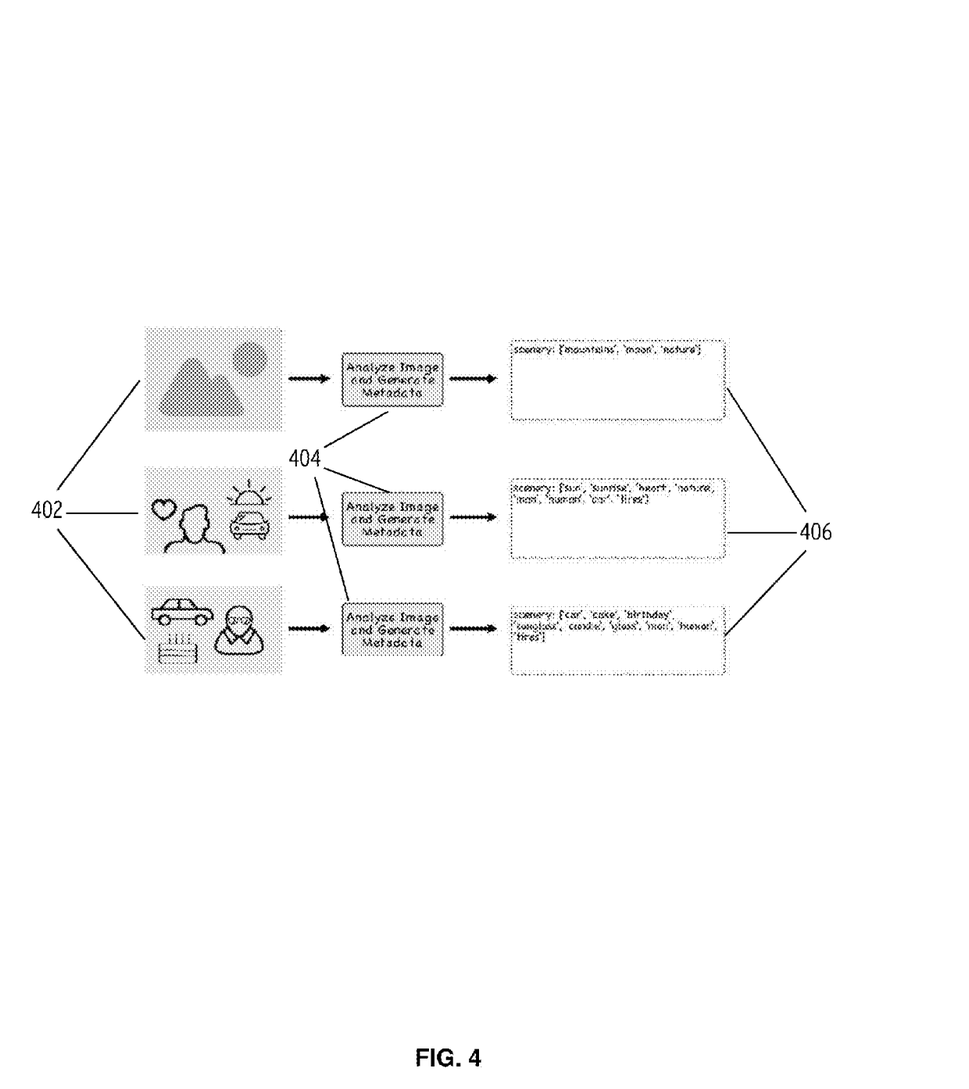
FIG. 4 illustrates an aspect of the first plugin services in accordance with one embodiment.

In another embodiment, as shown in FIG. 4, the system includes a first plugin service to generate metadata by interpreting the contents of an image. For example, images 402 are processed by routines 404 to generate metadata according to the scenery and objects detected in the image. Generated metadata elements 406 may be stored in a particular object as text or any other suitable data type used to represent the contents of images 402.

Figure 5:
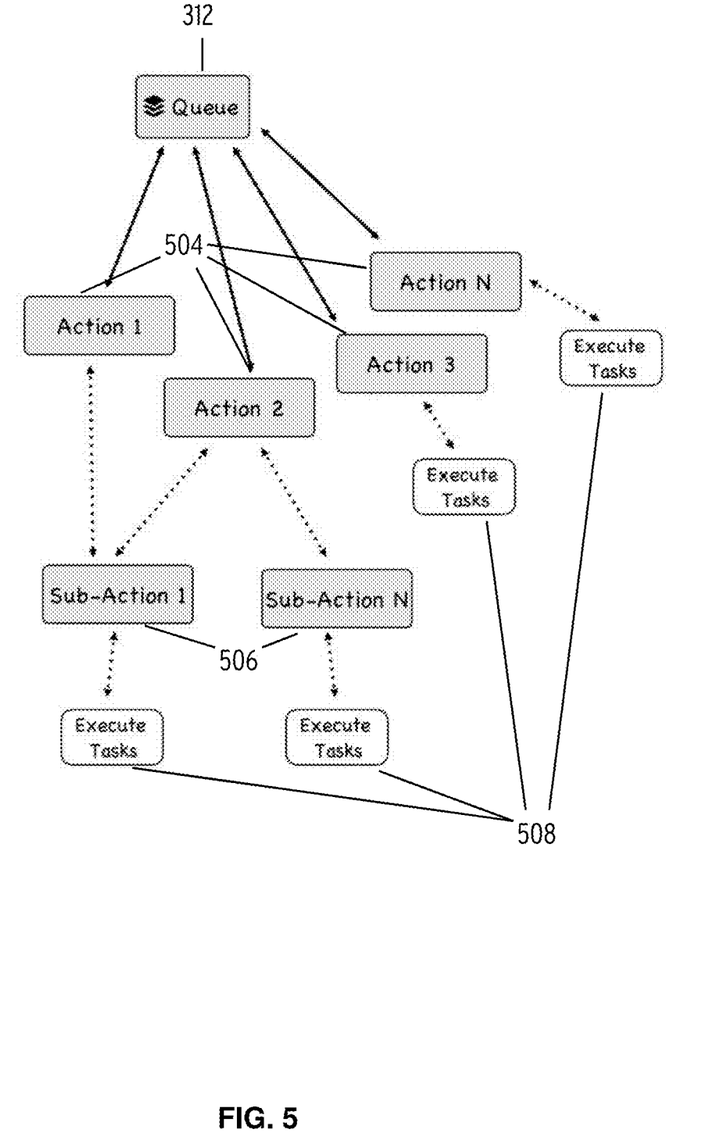
FIG. 5 illustrates scalability of the queue service.

As shown in FIG. 5, the event, trigger, or action may employ a queue 312 to which other processes or micro services can be registered to react and execute additional tasks or invoke sub-actions. Once metadata is extracted from a zone, events can be generated and triggers can be invoked. These actions 504 are stored in a queue 312 which executes the tasks 508. Actions 504 placed in the queue 312 may comprise sub-actions 506 performed sequentially or in distributed fashion. In one embodiment, actions 504 may be performed by independent processors. When the queue 312 detects that actions 504 in the queue are not timely processed, the queue 312 may scale the quality and quantity of processors to a suitable amount only while the surge of actions 504 is processed. After the queue 312 detects that the service does not require as many processors, it may scale down appropriately to avoid idle processors.

Figure 6:
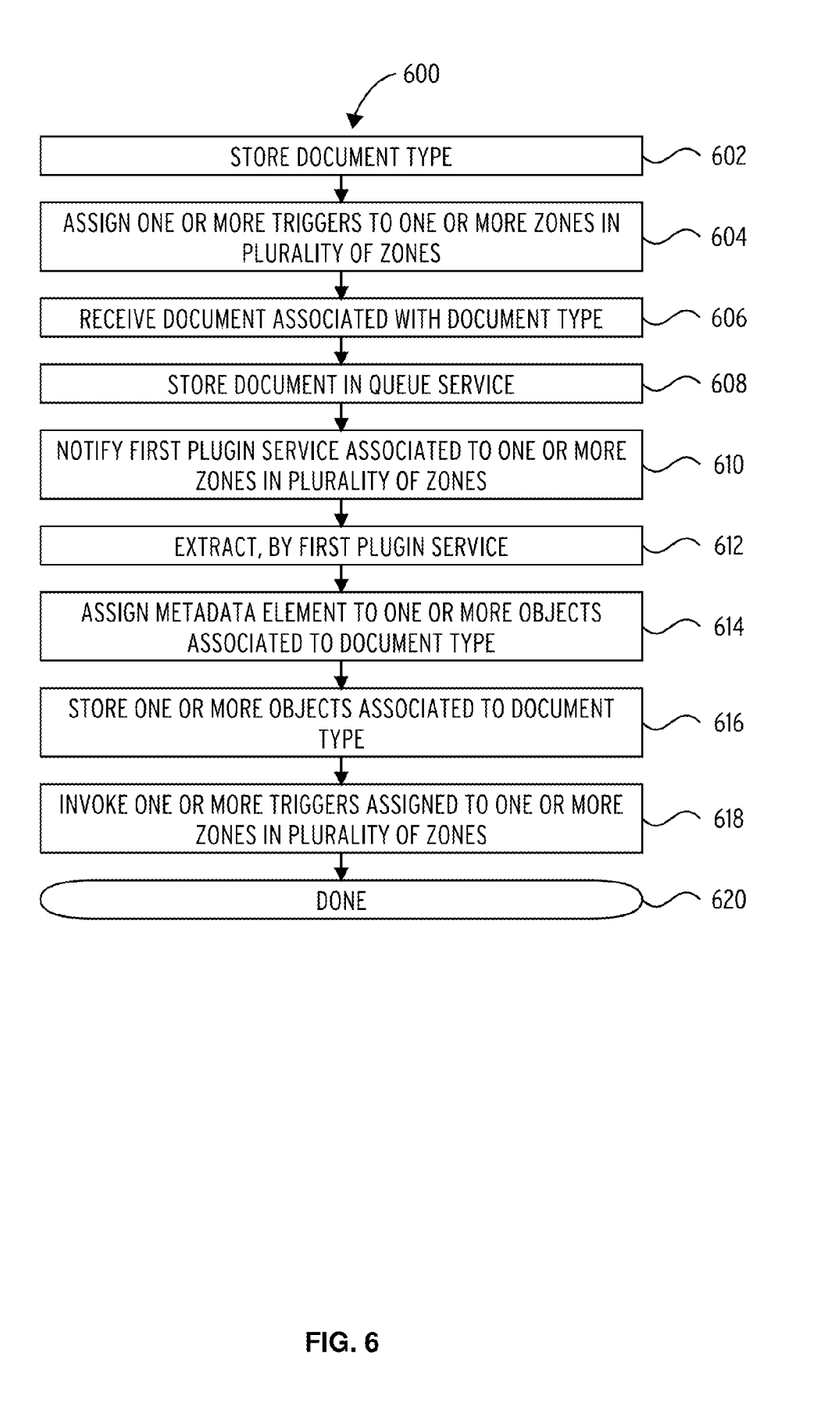
FIG. 6 illustrates a routine in accordance with one embodiment.

In block 602, routine 600 stores a document type. In block 604, routine 600 as signs one or more triggers to one or more zones in the plurality of zones. In block 606, routine 600 receives a document associated with the document type. In block 608, routine 600 stores the document in a queue service. In block 610, routine 600 notifies a first plugin service associated to the one or more zones in the plurality of zones. In block 612, routine 600 extracts, by the first plugin service. In block 614, routine 600 assigns the metadata element to one or more objects associated to the document type. In block 616, routine 600 stores the one or more objects associated to the document type. In block 618, routine 600 invokes the one or more triggers assigned to the one or more zones in the plurality of zones. In done block 620, routine 600 ends.

What is claimed is:

1. A zone-based metadata extraction method comprising:
   storing a document type comprising a plurality of zones;
   assigning one or more triggers to one or more zones in the plurality of zones;
   receiving a document associated with the document type;
   storing the document in a queue service;
   notifying a first plugin service associated to the one or more zones in the plurality of zones;
   extracting, by the first plugin service, a first metadata element associated to the one or more zones in the plurality of zones;
   assigning the first metadata element to one or more objects associated to the document type;
   storing the one or more objects associated to the document type; and,
   invoking the one or more triggers assigned to the one or more zones in the plurality of zones.

2. The zone-based metadata extraction method of claim 1, further comprising:
   notifying a second plugin service associated to the one or more zones in the plurality of zones;
   extracting, by the second plugin service, a second metadata element associated to the one or more zones in the plurality of zones;
   assigning the second metadata element to the one or more objects associated to the document type;
   storing the one or more objects associated to the document type; and,
   invoking the one or more triggers assigned to the one or more zones in the plurality of zones.

3. The zone-based metadata extraction method of claim 2, wherein the document associated with the document type comprises text and wherein extracting the first metadata element or the second metadata element associated to each zone in the plurality of zones comprises applying optical character recognition to the document associated with the document type.

4. The zone-based metadata extraction method of claim 2, wherein the document associated with the document type comprises wherein the document associated with the document type is a file in a binary format and wherein extracting the first metadata element or the second metadata element associated to each zone in the plurality of zones comprises metadata extraction from the binary format.

5. The zone-based metadata extraction method of claim 2, wherein the document associated with the document type is an image file and wherein extracting the first metadata element or the second metadata element associated to each zone in the plurality of zones comprises metadata extraction using computer vision.

6. The zone-based metadata extraction method of claim 2, wherein the document associated with the document type is a file in a native format and wherein extracting the first metadata element or the second metadata element associated to each zone in the plurality of zones comprises metadata extraction from the native format.

7. A non-transitory computer-readable storage medium, the computer-readable storage medium including instructions that when executed by a computer, cause the computer to:
   store a document type comprising a plurality of zones;
   assign one or more triggers to one or more zones in the plurality of zones;
   receive a document associated with the document type;
   store the document in a queue service;
   notify a first plugin service associated to the one or more zones in the plurality of zones;
   extract, by the first plugin service, a first metadata element associated to the one or more zones in the plurality of zones;
   assign the first metadata element to one or more objects associated to the document type;
   store the one or more objects associated to the document type; and, invoke the one or more triggers assigned to the one or more zones in the plurality of zones.

8. The computer-readable storage medium of claim 7, wherein the instructions further configure the computer to:
notify a second plugin service associated to the one or more zones in the plurality of zones;
extract, by the second plugin service, a second metadata element associated to the one or more zones in the plurality of zones;
assign the second metadata element to the one or more objects associated to the document type;
store the one or more objects associated to the document type; and,
invoke the one or more triggers assigned to the one or more zones in the plurality of zones.

9. The computer-readable storage medium of claim 8, wherein the document associated with the document type comprises text and wherein extracting the first metadata element or the second metadata element associated to each zone in the plurality of zones comprises apply optical character recognition to the document associated with the document type.

10. The computer-readable storage medium of claim 8, wherein the document associated with the document type is a file in a binary format and wherein extracting the first metadata element or the second metadata element associated to each zone in the plurality of zones comprises metadata extraction from the binary format.

11. The computer-readable storage medium of claim 8, wherein the document associated with the document type is an image file and wherein extracting the first metadata element or the second metadata element associated to each zone in the plurality of zones comprises metadata extraction using computer vision.

12. The computer-readable storage medium of claim 8, wherein the document associated with the document type is a file in a native format and wherein extracting the first metadata element or the second metadata element associated to each zone in the plurality of zones comprises metadata extraction from the native format.

13. A computing system, the computing system comprising:
a first processor;
a second processor;
an object and metadata storage;
a metadata storage; and
a first memory storing instructions that, when executed by the first processor, configure the system to:
store a document type comprising a plurality of zones in the object and metadata storage;
assign one or more triggers to one or more zones in the plurality of zones;
receive a document associated with the document type;
store the document in a queue service;
notify a first plugin service associated to the one or more zones in the plurality of zones;
a second memory storing instructions that, when executed by the second processor, configure the system to:
extract, by the first plugin service, a first metadata element associated to the one or more zones in the plurality of zones;
assign the first metadata element to one or more objects associated to the document type;
store the one or more objects associated to the document type in the metadata storage; and,
invoke the one or more triggers assigned to the one or more zones in the plurality of zones.

14. The computing system of claim 13, further comprising:
a third processor;
the first memory storing instructions, when executed by the first processor, further configure the system to notify a second plugin service associated to the one or more zones in the plurality of zones; and,
a third memory storing instructions that, when executed by the third processor, configure the system to:
extract, by the second plugin service, a second metadata element associated to the one or more zones in the plurality of zones;
assign the second metadata element to the one or more objects associated to the document type;
store the one or more objects associated to the document type in the metadata storage; and,
invoke the one or more triggers assigned to the one or more zones in the plurality of zones.

15. The computing system of claim 14, wherein the document associated with the document type comprises text and wherein extracting the first metadata element or the second metadata element associated to each zone in the plurality of zones comprises apply optical character recognition to the document associated with the document type.

16. The computing system of claim 14, wherein the document associated with the document type is a file in a binary format and wherein extracting the first metadata element or the second metadata element associated to each zone in the plurality of zones comprises metadata extraction from the binary format.

17. The computing system of claim 14, wherein the document associated with the document type is an image file and wherein extracting the first metadata element or the second metadata element associated to each zone in the plurality of zones comprises metadata extraction use computer vision.

18. The computing system of claim 14, wherein the document associated with the document type is a file in a native format and wherein extracting the first metadata element or the second metadata element associated to each zone in the plurality of zones comprises metadata extraction from the native format.

19. The computing system of claim 13, wherein the second memory storing instructions that, when executed by the second processor, further configure the system to replicate the metadata stored in the metadata storage to the object and metadata storage.

* * * * *